United States Patent [19]

Kassner

[11] Patent Number: 5,424,255

[45] Date of Patent: Jun. 13, 1995

[54] HIGH-REFRACTIVE INDEX PHOTOTROPIC GLASS

[75] Inventor: Reinhard Kassner, Alfeld, Germany

[73] Assignee: Deutsche Spezialglas AG, Grunenplan, Germany

[21] Appl. No.: 258,037

[22] Filed: Jun. 10, 1994

[30] Foreign Application Priority Data

Mar. 11, 1994 [DE] Germany .................. 44 08 190.1

[51] Int. Cl.⁶ .................. C03C 4/06; C03C 3/064
[52] U.S. Cl. .................. 501/13; 501/77
[58] Field of Search .................. 501/13, 77, 78

[56] References Cited

U.S. PATENT DOCUMENTS

| | | | |
|---|---|---|---|
| 4,084,978 | 4/1978 | Sagara | 501/63 |
| 4,149,896 | 4/1979 | Faulstich et al. | 501/13 |
| 4,251,278 | 2/1981 | Hares | 501/13 |
| 4,486,541 | 12/1984 | Gliemeroth et al. | 501/13 |
| 5,217,927 | 6/1993 | Behr et al. | 501/13 |

Primary Examiner—Karl Group
Attorney, Agent, or Firm—Millen, White, Zelano, & Branigan

[57] ABSTRACT

A high-refractive index phototropic glass having a refractive index of 1.69 to more than 1.7, an Abbe coefficient of at least 35 and a density of at most 3.5 g/cm³, has a composition (in % by weight based on oxide) of: $SiO_2$ 15–33; $B_2O_3$ 12–22; Σ $SiO_2+B_2O_3$ 30–50; $Li_2O$ 0.5–5.0; $Na_2O$ 0–3; $K_2O$ 0–11; Σ alkali oxides 4–12; BaO 0–23; SrO 0–23; Σ SrO+BaO 0–23; $ZrO_2$ 5–14; $Nb_2O_5$ 15–24; $Ta_2O_5$ 2–11. As the carrier of the phototropism, the glass also has 0.10 to 0.35 of $Ag_2O$; 0.15–0.65 of Cl; 0.15–0.45 of Br and 0.005–0.030 of CuO. The glass can also be doped with 1–3 ppm of gold or one or more platinum metals, especially palladium.

13 Claims, No Drawings

HIGH-REFRACTIVE INDEX PHOTOTROPIC GLASS

The object of the invention is a high-refractive index phototropic glass of comparatively low density, which can be used as an ophthalmic lens and which contains as a carrier of phototropism deposits of silver halides and copper oxides.

BACKGROUND OF THE INVENTION

More recently, glasses are being increasingly used in ophthalmic optics, which glasses are distinguished by a high refractive index and low density. By virtue of these glasses, thinner and lighter lenses can be produced, which is particularly advantageous to eyeglass wearers having a need for greater corrections of defective vision. For high-refractive index glasses (see, e.g., U.S. Pat. No. 4,084,978), primarily colorless or ionically tinted types have been provided. Since phototropic glasses have gained comparatively greater notoriety than corrective spectacle lenses in recent years, there is thus a demand for higher-refractive index phototropic glasses.

The first phototropic glass possessing the desired properties of phototropism, a high refractive index and low density was achieved according to EP 0 063 790-A. But these glasses have the drawback that they must contain a relatively high halide portion in order to satisfy the desirable kinetics of the phototropism, i.e., sufficiently quick darkening in the case of insolation and brightening in the case of deficient exposure. But, because of high and varying evaporation of the halides when the glass batch is melted, a constancy of the phototropic properties can be maintained only with a great deal of difficulty.

Conversely, a high-refractive index phototropic glass with low density and low halogen contents was described for the first time in DE 38 25 210-C2, but this glass has a refractive index $n_d$ of only between about 1.60 and 1.61, an Abbe coefficient between about 41.5 and 43, and a density of less than 3 g/cm$^3$.

SUMMARY OF THE INVENTION

An object of the invention is to provide a phototropic glass, having a refractive index higher than 1.61, a low density, and a high Abbe coefficient.

Upon further study of the specification and appended claims, further objects and advantages of this invention will become apparent to those skilled in the art.

To obtain these objects, a glass is provided containing as a basic glass (in % by weight based on oxide) SiO$_2$ 15–33; B$_2$O$_3$ 15–22; Σ SiO$_2$+B$_2$O$_3$ 30–50; Li$_2$O 0.5–5; Na$_2$O 0–3; K$_2$O 0–11; Σ alkali oxides 4–12; BaO 0–23; SrO 0–23; Σ BaO+SrO 0–23; ZrO$_2$ 5–14; Nb$_2$O$_5$ 15–24; and Ta$_2$O$_5$ 3–10, as well as a carrier of phototropism, in addition to this basic glass composition, comprising Ag$_2$O 0.1–0.35; Cl 0.15–0.65; Br 0.15–0.45; CuO 0.005–0.030.

The basic glass contains neither lead nor cadmium nor zinc and, except for unavoidable raw material impurities, is free of Al$_2$O$_3$, CaO, MgO and La$_2$O$_3$. Al$_2$O$_3$, often an essential component of other phototropic glasses, has proven detrimental to this glass system. On the one hand, Al$_2$O$_3$ reduces the chemical resistance to acid attack, and on the other hand, it increases the tendency toward undesired phase separation during annealing. As for La$_2$O$_3$, CaO and MgO, they all have a negative effect on the phototropic phase. Except for unavoidable raw material impurities, the glass is also devoid of TiO$_2$, ordinarily a typical component of high-refractive index glasses, since in the present glass composition, it negatively influences phase separation as well as the tendency toward crystallization. The maximum content of Al$_2$O$_3$, CaO, MgO, La$_2$O$_3$ and TiO$_2$ which can be tolerated as an impurity should not be greater than 2%, preferably not greater than 1%, for each, and the sum of these components also should not be greater than 2%, and preferably not greater than 1%.

SiO$_2$ is present in the glass in an amount of 15–33% by weight. If the amount is less than 15% by weight, the chemical stability of the glass noticeably decreases. If 33% by weight is exceeded, the necessary refractive index of at least 1.690 cannot be achieved. Preferred are SiO$_2$ contents of 20–29% by weight, and especially preferred are contents of 21–27% by weight.

The content of B$_2$O$_3$ should be between 12 and 22% by weight. If the amount is less than 12% by weight, there is a negative influence on glass stability and the meltability of the glass; conversely, if an amount of 22% by weight is exceeded, the chemical and hydrolytic properties of the glass can be negatively influenced. Preferred is a content of B$_2$O$_3$ of 14–18% by weight. The sum of components SiO$_2$+B$_2$O$_3$ is to be between 30 and 50% by weight, since in this range, a sufficient stability of the glass with good meltability and good chemical resistance is obtained. But it is preferred that the sum of these components be between 35 and 47, especially between 38 and 47% by weight.

The addition of alkali oxides facilitates the melting of the glass. A content of lithium oxide of 0.5–5% by weight is necessary. Preferred is a lithium oxide content of 0.5–4, especially of 0.5 to 2% by weight. A content of sodium oxide is not absolutely necessary, but it can be present in the glass in amounts of up to 3% by weight. Potassium oxide can be present in the amounts of 0–11% by weight, preferably in amounts of 0–8%. It is especially preferred if the glass has a content of potassium oxide of 1–6% by weight. Also the sum of the alkali oxides is to be between 4 and 12% by weight. In the case of an alkali oxide content of less than 4%, the melting of the glass becomes increasingly more difficult, and above 12% by weight, problems occur with chemical durability, excessive phase separation and negative influencing of phototropism. It has become evident that in general, especially advantageous results can be achieved with alkali oxide contents of 6.5 to 10% by weight.

Of the alkaline-earth oxides, barium and strontium can be present in the glass in amounts of 0–23% by weight each, but the sum of these oxides should not exceed 23% by weight, since otherwise the acid resistance deteriorates and the kinetics of the phototropism can be detrimentally influenced. It is preferred that only strontium of the alkaline-earth oxides be present and especially in amounts of 17–23% by weight.

The oxides of zirconium, niobium and tantalum result in, above all, an increase in the refractive index of the glass. Furthermore, ZrO$_2$ imparts to the glass a high chemical stability, and both Nb$_2$O$_5$ and Ta$_2$O$_5$ provide a good devitrification stability without influencing the phototropism disadvantageously. ZrO$_2$ is present in the glass in amounts of 5–14% by weight, with 5–8% by weight being preferred. Nb$_2$O$_5$ is present in the glass in amounts of 15–24%, preferably in amounts of 18–22% or 18–20% by weight and Ta$_2$O$_5$ is added to the glass in amounts of 2–11% by weight, with 2–8% by weight being preferred because of the high cost of $Ta_2O_5$.

The glass contains, in addition to the basic glass, a carrier for phototropism comprising 0.1–0.35% by weight of $Ag_2O$; 0.15–0.65% by weight of Cl; 0.15–0.45% by weight of Br and 0.005–0.030% by weight of CuO, these amounts being based on the total glass composition.

An especially advantageous basic glass composition has (in % by weight based on the oxide) the following composition:

$SiO_2$ 21–27; $B_2O_3$ 14–18; $\Sigma$ $SiO_2+B_2O_3$ 38–47; $Li_2O$ 0.5–4; $Na_2O$ 0–3; $K_2O$ 1–6; $R_2O$ 4–12; SrO 17–23; $ZrO_2$ 5–8; $Nb_2O_5$ 18–22; $Ta_2O_5$ 5–10.5. This basic glass composition contains in addition the mentioned requisite amounts of $Ag_2O$, Cl, Br and CuO as carrier of the phototropism.

The described phototropic glasses are colored gray to gray-blue under the effect of sunlight. If a brown coloration in the exposed state is desired, the glass can be doped in a way known in the art with 1–3 ppm of gold or one or more platinum metals, especially with palladium.

Moreover, it can also be advantageous to impart to the glass a primary coloration, e.g., by adding up to 2% by weight of coloring oxides. Especially suitable are, e.g., one or more oxides of the group up to 1% by weight of $Er_2O_3$, up to 1% by weight of $Nd_2O_3$, up to 0.1% by weight of CoO, up to 0.3% by weight of NiO or up to 0.1% by weight of $Cr_2O_3$.

The glasses according to the invention have a high refractive index $n_e$ of at least 1.69, preferably 1.704, an Abbe coefficient of at least 35, preferably above 37, especially more than 39, and a density of not more than 3.5 g/cm³, preferably below 3.4 g/cm³.

These glasses have excellent phototropic properties and meet all requirements for spectacle lenses, such as coatability with reflection-reducing layers, as well as sufficient resistance to cleaning chemicals and other agents to which spectacles are exposed during normal use.

Without further elaboration, it is believed that one skilled in the art can, using the preceding description, utilize the present invention to its fullest extent. The following preferred specific embodiments are, therefore, to be construed as merely illustrative, and not limitative of the remainder of the disclosure in any way whatsoever.

In the foregoing and in the following examples, all temperatures are set forth uncorrected in degrees Celsius and unless otherwise indicated, all parts and percentages are by weight.

The entire disclosures of all applications, patents and publications, cited above and below, and of corresponding application(s) German P 44 08 190.1, filed Mar. 11, 1994, are hereby incorporated by reference.

EXAMPLES

Various glasses were melted in a platinum crucible at 1300° C., then poured into a steel mold and cooled in a batch furnace at a rate of about 80° C. per hour. From these cooled castings, samples were cut that were annealed at 600° to 650° C. for about 2.5 hours. From the samples, polished 2 mm thick sheets were then produced, by which the kinetics of phototropism was measured. The results of these measurements, the composition of the glasses as well as their physical properties are summarized in the following table.

In the table, $n_e$ represents the refractive index at 546 nm, $v_e$ the corresponding Abbe constant, d the density of the glass at 20° C. in g/cm³, $T_o$ the initial transmission of the unexposed glass in %, $T_s$ the saturation transmission at 23° C. in % and $T_r$ the transmission, which, starting from the saturation state, is adjusted in % after 30 minutes of brightening. (In general, the relationship between the $n_e$ values and $n_d$ is: $n_e - 0.003 \approx n_d$.)

| Example | 1 | 2 | 3 | 4 | 5 | 6 | 7 | 8 | 9 |
|---|---|---|---|---|---|---|---|---|---|
| $SiO_2$ | 25.7 | 30.7 | 28.7 | 31.5 | 20.5 | 20.5 | 24.8 | 24.8 | 15.0 |
| $B_2O_3$ | 14.0 | 12.0 | 14.0 | 12.3 | 17.3 | 17.3 | 13.0 | 13.0 | 21.3 |
| $Li_2O$ | 1.7 | 1.7 | 1.7 | 1.7 | 1.7 | 1.7 | 1.7 | 1.7 | 1.7 |
| $Na_2O$ | 1.8 | 1.8 | | | | | | 2.0 | 1.5 |
| $K_2O$ | 5.3 | 5.3 | 7.0 | 7.2 | 6.1 | 6.1 | 6.1 | 4.1 | 6.1 |
| SrO | | | | 5.6 | | 12.1 | 22.1 | 22.1 | 22.1 |
| BaO | 8.0 | 8.0 | 8.0 | | 22.1 | 10.0 | | | |
| $ZrO_2$ | 14.0 | 8.0 | 8.0 | 8.2 | 5.2 | 5.2 | 5.2 | 5.2 | 5.2 |
| $Nb_2O_5$ | 18.9 | 21.8 | 21.8 | 22.1 | 19.5 | 19.5 | 19.5 | 19.5 | 19.5 |
| $Ta_2O_5$ | 10.1 | 10.1 | 10.1 | 10.2 | 5.6 | 5.6 | 5.6 | 5.6 | 5.6 |
| $Ag_2O$ | 0.17 | 0.17 | 0.17 | 0.175 | 0.171 | 0.171 | 0.25 | 0.25 | 0.21 |
| Cl⁻ | 0.30 | 0.30 | 0.30 | 0.31 | 0.39 | 0.39 | 0.64 | 0.64 | 0.50 |
| Br⁻ | 0.26 | 0.26 | 0.26 | 0.27 | 0.34 | 0.34 | 0.32 | 0.32 | 0.32 |
| CuO | 0.012 | 0.012 | 0.012 | 0.012 | 0.015 | 0.015 | 0.027 | 0.027 | 0.020 |
| $n_e$ | 1.70166 | 1.69822 | 1.69481 | 1.69020 | 1.71070 | 1.70842 | 1.70472 | 1.70388 | 1.70110 |
| $v_I$ | 35.3 | 35.1 | 35.2 | 35.2 | 37.2 | 38.0 | 39.1 | 39.0 | 39.1 |
| d | 3.34 | 3.30 | 3.40 | 3.19 | 3.44 | 3.47 | 3.47 | 3.45 | 3.40 |
| % $\tau_0$ | 87.0 | 88.0 | 85.0 | 87.5 | 83.9 | 86.8 | 86.2 | 85.0 | 83.2 |
| % $\tau_S$ | 19.2 | 26.7 | 29.8 | 26.8 | 35.0 | 40.4 | 21.6 | 17.5 | 32.3 |
| % $\tau_R$ | 76.9 | 66.8 | 75.1 | 80.3 | 79.2 | 76.7 | 74.3 | 73.8 | 78.9 |

| Example | 10 | 11 | 12 | 13 | 14 | 15 | 16 | 17 |
|---|---|---|---|---|---|---|---|---|
| $SiO_2$ | 25.5 | 25.5 | 26.0 | 26.0 | 25.0 | 24.0 | 24.0 | 24.0 |
| $B_2O_3$ | 13.0 | 15.0 | 15.0 | 17.0 | 17.0 | 17.0 | 17.0 | 17.0 |
| $Li_2O$ | 1.0 | 1.0 | 0.5 | 0.5 | 0.5 | 2.5 | 3.5 | 3.5 |
| $Na_2O$ | 2.0 | 2.0 | 1.5 | 1.5 | 1.0 | 1.5 | 1.5 | 1.5 |
| $K_2O$ | 4.1 | 4.1 | 4.1 | 4.1 | 4.1 | 2.1 | 2.1 | 2.1 |
| SrO | 22.1 | 20.1 | 20.1 | 20.1 | 20.1 | 20.1 | 19.1 | 7.7 |
| BaO | | | | | | | | 19.1 |
| $ZrO_2$ | 7.7 | 7.7 | 7.7 | 7.7 | 7.7 | 7.7 | 7.7 | 7.7 |
| $Nb_2O_5$ | 18.0 | 18.0 | 18.5 | 18.5 | 18.5 | 18.5 | 18.5 | 18.5 |
| $Ta_2O_5$ | 5.6 | 5.6 | 5.6 | 5.6 | 5.6 | 5.6 | 5.6 | 5.6 |
| $Ag_2O$ | 0.16 | 0.18 | 0.18 | 0.18 | 0.16 | 0.18 | 0.18 | 0.18 |

-continued

| | | | | | | | | |
|---|---|---|---|---|---|---|---|---|
| Cl⁻ | 0.40 | 0.40 | 0.40 | 0.40 | 0.35 | 0.40 | 0.40 | 0.40 |
| Br⁻ | 0.28 | 0.25 | 0.25 | 0.25 | 0.25 | 0.32 | 0.32 | 0.32 |
| CuO | 0.017 | 0.020 | 0.020 | 0.020 | 0.020 | 0.027 | 0.027 | 0.027 |
| $n_e$ | 1.70125 | 1.69431 | 1.69379 | 1.69122 | 1.69418 | 1.70355 | 1.70335 | 1.69800 |
| $v_l$ | 39.2 | 39.3 | 38.8 | 38.8 | 38.4 | 39.3 | 39.4 | 38.8 |
| d | 3.46 | 3.39 | 3.38 | 3.35 | 3.37 | 3.39 | 3.38 | 3.37 |
| % $\tau_0$ | 83.7 | 87.0 | 86.3 | 85.6 | 86.2 | 86.2 | 84.9 | 87.7 |
| % $\tau_S$ | 16.7 | 16.7 | 39.2 | 21.3 | 31.1 | 25.9 | 26.9 | 20.5 |
| % $\tau_R$ | 75.4 | 72.3 | 77.3 | 66.1 | 75.1 | 72.5 | 72.9 | 68.7 |

The preceding examples can be repeated with similar success by substituting the generically or specifically described reactants and/or operating conditions of this invention for those used in the preceding examples.

From the foregoing description, one skilled in the art can easily ascertain the essential characteristics of this invention, and without departing from the spirit and scope thereof, can make various changes and modifications of the invention to adapt it to various usages and conditions.

What is claimed is:

1. A high-refractive index phototropic glass, having a density of $\geq 3.5$ g/cm³, a refractive index of $>1.69$, an Abbe coefficient of $>35$ and a basic glass composition, expressed in % by weight based on oxide consisting essentially of:

| | |
|---|---|
| $SiO_2$ | 15–23 |
| $B_2O_3$ | 12–22 |
| $\Sigma\ SiO_2 + B_2O_3$ | 30–50 |
| $Li_2O$ | 0.5–5.0 |
| $Na_2O$ | 0–3 |
| $K_2O$ | 0–11 |
| $\Sigma$ alkali oxides | 4–12 |
| BaO | 0–23 |
| SrO | 0–23 |
| $\Sigma\ SrO + BaO$ | 0–23 |
| $ZrO_2$ | 5–14 |
| $Nb_2O_5$ | 15–24 |
| $Ta_2O_5$ | 2–11 | and as a carrier of phototropism in addition to the basic glass composition:

| | |
|---|---|
| $Ag_2O$ | 0.10–0.35 |
| Cl | 0.15–0.65 |
| Br | 0.15–0.45 |
| CuO | 0.005–0.030% by weight. |

2. A high-refractive index phototropic glass according to claim 1, wherein the basic glass composition, expressed in % by weight, consisting essentially of:

| | |
|---|---|
| $SiO_2$ | 21–27 |
| $B_2O_3$ | 14–18 |
| $\Sigma\ SiO_2 + B_2O_3$ | 38–47 |
| $Li_2O$ | 0.5–4 |
| $Na_2O$ | 0–3 |
| $K_2O$ | 1–6 |
| $\Sigma\ R_2O$ | 4–12 |
| SrO | 17–23 |
| $ZrO_2$ | 5–8 |
| $Nb_2O_5$ | 18–22 |
| $Ta_2O_5$ | 5–10.5. |

3. A high-refractive index phototropic glass according to claim 1, further containing 1–3 ppm of gold or one or more platinum group metals, whereby the glass exhibits a brown coloration upon exposure.

4. A high-refractive index phototropic glass according to claim 2, further containing 1–3 ppm of gold or one or more platinum group metals, whereby the glass exhibits a brown coloration upon exposure.

5. A high-refractive index phototropic glass according to claim 1, wherein for coloration, containing in addition, not more than about 2% by weight of coloring oxides.

6. A high-refractive index phototropic glass according to claim 2, wherein for coloration, containing in addition, not more than about 2% by weight of coloring oxides.

7. A high-refractive index phototropic glass according to claim 3, wherein for coloration, containing in addition, not more than about 2% by weight of coloring oxides.

8. A high-refractive index phototropic glass according to claim 4, wherein for coloration, containing in addition, not more than about 2% by weight of coloring oxides.

9. A high refractive index phototropic glass according to claim 1, wherein the content of the sum of $Al_2O_3$, CaO, MgO, $La_2O_3$ and $TiO_2$ is not greater than 2%.

10. A high refractive index phototropic glass according to claim 1, wherein the content of the sum of $Al_2O_3$, CaO, MgO, $La_2O_3$ and $TiO_2$ is not greater than 1%.

11. A high refractive index phototropic glass according to claim 2, wherein $Li_2O$ is present in a content of 0.5–2% by weight.

12. A high refractive index phototropic glass according to claim 10, wherein $Li_2O$ is present in a content of 0.5–2% by weight.

13. A high refractive index phototropic glass according to claim 11, wherein the content of $Nb_2O_5$ is 18–20% by weight.

* * * * *